United States Patent
Vishey et al.

(10) Patent No.: US 6,896,321 B2
(45) Date of Patent: May 24, 2005

(54) VEHICLE HEADLINER

(75) Inventors: Gregory J. Vishey, Wood, MI (US); Frederick Hjortsberg, Perrysburg, OH (US); James Mastrangelo, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/262,632

(22) Filed: Oct. 1, 2002

(65) Prior Publication Data

US 2004/0061358 A1 Apr. 1, 2004

(51) Int. Cl.$^7$ .................................................. B60J 7/00
(52) U.S. Cl. ...................... 296/214; 296/211; 29/897.2
(58) Field of Search ................................ 296/211, 210, 296/214, 37.7; 29/897.2

(56) References Cited

U.S. PATENT DOCUMENTS

| | | | |
|---|---|---|---|
| 4,495,731 A | | 1/1985 | Sears |
| 4,642,153 A | | 2/1987 | Lohr |
| 4,851,274 A | | 7/1989 | D'Elia |
| 5,308,678 A | * | 5/1994 | Tsujimura et al. .......... 296/214 |
| 5,660,908 A | * | 8/1997 | Kelman et al. ............. 296/214 |
| 5,804,262 A | * | 9/1998 | Stevens et al. ............. 296/214 |
| 5,888,616 A | * | 3/1999 | Ang ............................. 296/214 |
| 5,892,187 A | | 4/1999 | Patrick |
| RE36,323 E | | 10/1999 | Thompson et al. |
| 5,968,629 A | | 10/1999 | Masui et al. |
| 5,989,699 A | | 11/1999 | Kuczynski et al. |
| 6,007,890 A | | 12/1999 | DeBlander |
| 6,033,756 A | | 3/2000 | Handscomb |
| 6,036,896 A | * | 3/2000 | Gupte ...................... 264/37.17 |
| 6,127,021 A | * | 10/2000 | Kelman ....................... 296/211 |
| 6,202,786 B1 | | 3/2001 | Pfaffelhuber et al. |
| 6,220,388 B1 | | 4/2001 | Sanborn |
| 6,267,428 B1 | * | 7/2001 | Baldas et al. ............... 296/37.7 |
| 6,268,047 B1 | | 7/2001 | Mulder et al. |
| 6,297,176 B1 | * | 10/2001 | North et al. ................. 442/120 |
| 6,338,517 B1 | | 1/2002 | Canni et al. |
| 6,345,688 B1 | | 2/2002 | Veen et al. |
| 6,364,976 B2 | * | 4/2002 | Fletemier et al. .......... 156/62.2 |
| 6,368,702 B1 | * | 4/2002 | Erickson ................... 428/292.1 |
| 2001/0037854 A1 | * | 11/2001 | Byma et al. .............. 156/309.9 |
| 2001/0042935 A1 | | 11/2001 | Barber et al. |
| 2001/0050196 A1 | | 12/2001 | Okada et al. |
| 2002/0027997 A1 | | 3/2002 | Watanabe et al. |
| 2002/0122930 A1 | * | 9/2002 | Shimizu et al. ........... 428/317.1 |
| 2002/0134616 A1 | * | 9/2002 | Sheperd ....................... 181/290 |
| 2003/0164218 A1 | * | 9/2003 | Brahm et al. ................ 296/214 |

OTHER PUBLICATIONS

Jean M. Hoffman, "Light as a feather—stiff as a board", Apr. 19, 2001, pp. 74, 76 and 78, Machine Design magazine.

\* cited by examiner

*Primary Examiner*—Jason Morrow
(74) *Attorney, Agent, or Firm*—Bill C. Panagos

(57) ABSTRACT

A vehicle headliner including a shell having a first layer made of a polymeric resin sheet with glass fibers interspersed within the resin sheet, and a second layer of fibrous material having sound attenuating properties. In a preferred method of manufacturing the shell of a headliner the first and second layers are heated such that the temperature of the first layer is different than the temperature of the second layer. The first and second layers are then inserted into a mold having a desired contoured shape. The first and second layers are then compressed together to bond the layers, thereby forming the shell.

18 Claims, 3 Drawing Sheets

US 6,896,321 B2

VEHICLE HEADLINER

BACKGROUND OF THE INVENTION

This invention relates in general to vehicle headliners, and in particular to a headliner having improved structural integrity.

Virtually all passenger vehicles include a headliner attached under the roof structure of the vehicle. The headliner functions as a decorative trim piece and also preferably provides sound absorption or attenuation to help reduce the noise level within the vehicle. The headliner may also function as a support structure for the mounting of various vehicle components, such as light fixtures, overhead consoles, storage compartments, electronic displays, entertainment systems, and assist handle components.

Typically, headliners are formed of a plurality of layers having different materials. It is known to form a headliner with an upper layer of fiberglass, an intermediate layer of fibrous polyethylene terephthalate (PET), and a cover layer. The upper layer of fiberglass and the PET layer are laminated together with a polyester adhesive layer cured in an oven. The cover layer has an exterior surface facing the interior of the vehicle, commonly referred to in the industry as an "A surface". A known cover layer includes a woven or non-woven cloth. Sometimes, the cover layer includes an upper layer of foam, such as polyether-polyurethane foam. The foam of the cover layer provides a relatively pleasant soft elastic tactile "feel". Since the foam of the cover layer is elastic, the foam may also help to reduce gaps between the headliner and other trim pieces and components installed on or adjacent the headliner. Another known headliner composite includes an upper layer of fiberglass, a layer of PET, another layer of fiberglass, and a cover layer sandwiched together. Although these known fiberglass embedded headliners have been adequate in the past, it has been found that the structural integrity of the headliners, essentially provided by the fiberglass layers, is not sufficient for modern vehicles having a variety of relatively heavy components attached thereto. Furthermore, fiberglass has some undesirably characteristics in that it is potentially irritating to the skin of the assemblers.

Another known multi-layer headliner includes an upper structural layer and a lower cover layer bonded thereto. The structural layer is a glass mat layer made of thermoplastic resin reinforced with glass fibers interspersed therein. The upper layer is commercially available under the Trademark "AZDEL" from Azdel, Inc. of Shelby, N.C. The cover layer is similar to the cover layer described above. Although this headliner is sufficient for some vehicles, the sound absorption properties is often inadequate.

BRIEF SUMMARY OF THE INVENTION

This invention relates to the composition and method of manufacturing a shell for a headliner of a vehicle. The shell has a first layer made of a polymeric resin sheet with glass fibers interspersed within the resin sheet, and a second layer of fibrous material having sound attenuating properties. Preferably, the fibrous material is made of polyethylene terephthalate. A cover layer can then be bonded on the lower surface of the shell.

In a preferred method of manufacturing the shell, the first and second layers are heated such that the temperature of the first layer is different than the temperature of the second layer. The first and second layers are then inserted into a mold having a desired contoured shape. The first and second layers are then compressed together to bond the layers, thereby forming the shell.

Various objects and advantages of this invention will become apparent to those skilled in the art from the following detailed description of the preferred embodiment, when read in light of the accompanying drawings.

DETAILED DESCRIPTION OF THE INVENTION

Figure 1:
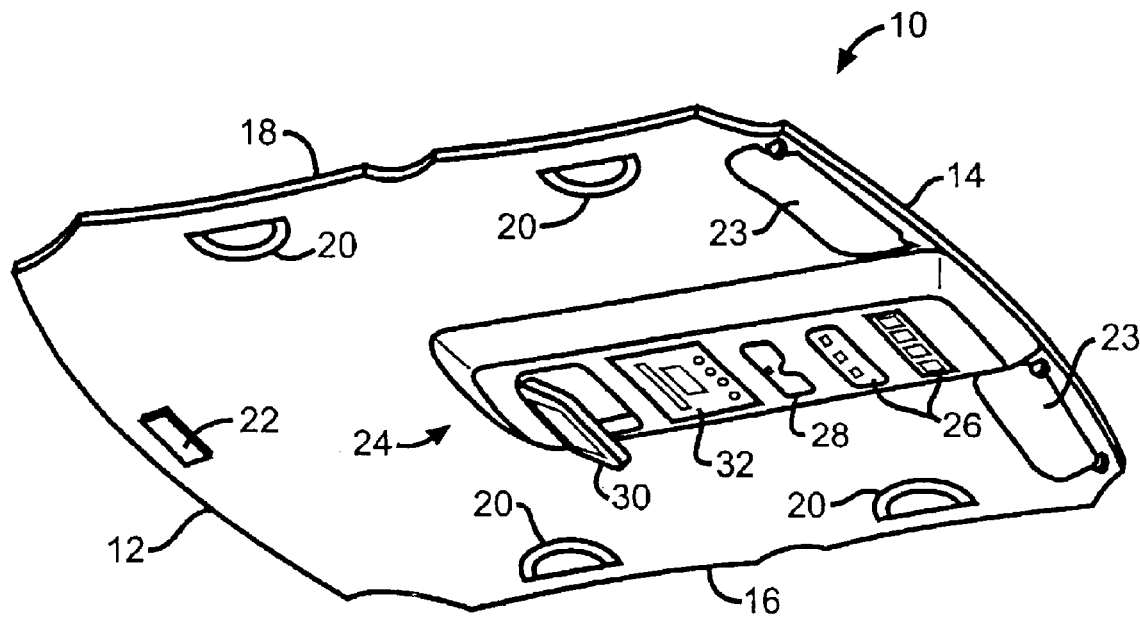
FIG. 1 is a perspective view of headliner formed in accordance with the present invention.

Referring now to the drawings, there is illustrated in FIG. 1, a vehicle headliner, indicated generally at 10, in accordance with the present invention. The headliner 10 has longitudinal ends 12 and 14, and lateral sides 16 and 18. The headliner 10 is adapted to be installed onto the interior or lower surface of a vehicle roof, such as by the use of clips (not shown). Of course, the headliner 10 can include any suitable mounted fixtures or apertures for securing the headliner 10 to the roof of a vehicle. The headliner 10 may also include extra vehicle components mounted thereon. Examples of these extra components are assist handles 20, light fixtures 22, sun visors 23, and an overhead console, indicated generally at 24. The overhead console 24 can include control mechanisms 26, storage compartment housings 28, a flip down monitor 30, and an audiovisual player/recorder unit 32. The player unit 32 can be any suitable player for playing any conventional media, such as tapes, compact discs, or digital video discs.

Typically, headliners are installed into the vehicle through the frame's windshield opening or the rear window opening. Typically, an assembly worker holds up one end 12 and another assembly worker holds up the other end 14 during installation. The edges of the longitudinal ends of the headliner 10 are slightly bowed in a lateral direction to fit through the openings. Due to this installation process the headliner 10 is flexible enough to slightly bow but should have enough structural integrity to not crease or fold in a lateral direction due to its own weight when supported by the workers. The headliner 10 of the present invention is made of a unique laminate structure for sufficient support compared to conventional headliners, especially when extra components such as the overhead console 24 are mounted thereon. For conventional headliners having extra components mounted thereon, the center portion of the headliner must be supported to prevent excessive deformation or creasing. To support the central portion, sometimes additional workers hold up the sides 16 and 18 of the headliner. It is also know to us mechanical assistance, such as assist arms or lift mechanisms which hold up the central portion of the headliner and move with the headliner during the installation process. Contrary, the headliner 10 of the present invention is able to support its own weight along with the weight of the extra components such that only two assembly workers without mechanical assistance are required for installation. The headliner 10 is ideally suited for use as a headliner module wherein the extra components are mounted on the headliner 10 at an assembly plant and then shipped to a vehicle assembly plant where the headliner 10 is then installed as a single unit. Conventionally, older headliners were either required to use more than two workers, use mechanical assistance, or mount the extra components separately after installation of the headliner.

Figure 2:
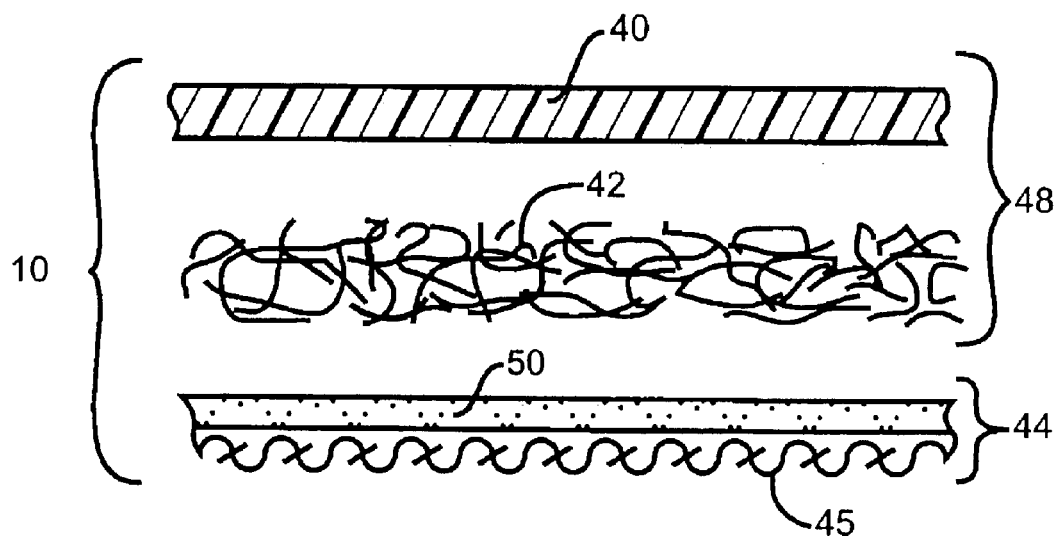
FIG. 2 is a schematic cross-section of a portion of the headliner of FIG. 1 illustrating a first embodiment of the invention.

There is illustrated in FIG. 2 a first embodiment of the construction of the headliner 10. The headliner 10 generally includes an upper layer 40, an intermediate layer 42, and a cover layer 44. The upper layer 40 is adjacent the roof structure when installed into the vehicle. The upper layer 40 is preferably a structural layer such that the upper layer 40 can support the weight of the upper layer 40, the intermediate layer 42, and the cover layer 44 when supported solely at its ends 12 and 14. More preferably, the upper layer 40 can support the headliner 10 and the extra components when supported at its ends 12 and 14. The upper layer 40 is preferably made of a thermoplastic resin reinforced with glass fibers interspersed therein. A thermoplastic resin layer having reinforced glass fibers is commercially available under the Trademark "AZDEL" from Azdel, Inc. of Shelby, N.C. This resin layer can be supplied in generally planar sheet form. Another suitable material for forming the upper layer 40 is a moldable composite sheet which is formed by extruding layers of polypropylene resin with needled mats of continuous glass fiber strand.

The intermediate layer 42 is preferably a fibrous layer having adequate sound attenuating properties such that the decibel level of sound or noise directed at the headliner is attenuated so that the decibel level of the reflected sound is at an acceptably reduced amount. Although the intermediate layer 42 can be any suitable material having sound attenuating properties, preferably the intermediate material is made of fibrous polyethylene terephthalate (PET). Preferably, the intermediate material is made at least partially of a material having an absorption incidence of 20 metric sabins or greater for a frequency range of about between 650 Hz to about 10,000 Hz as performed under the American Society of Testing and Materials ASTM C423-90A, Standard of Test Method for Sound Absorption. It should be understood that the intermediate layer does not have to consist only of fibrous materials but can include other materials or additives, such as binders or adhesives, added into the intermediate layer.

The upper layer 40 and the intermediate layer 42 are preferably bonded together to form a shell 48. The upper layer 40 and the intermediate layer 42 can be supplied in generally rectangular shaped sheets, generally corresponding to the dimensions of the headliner 10. The shell 48 can be formed into any suitable contoured shape defining the shape of the headliner 10. Preferably, this is accomplished by heating the upper layer 40 and the intermediate layer 42 and inserting them into a mold having the desired contoured shape. The upper layer 40 and the intermediate layer 42 are then compressed in the mold, thereby forming the shell 48. The upper layer 40 will generally be bonded to the intermediate layer 42 due to the tackiness of the thermoplastic resin layer when heated. A preferred method of manufacturing the headliner 10 will be explained in further detail below.

After the shell 48 is formed, the generally flexible cover layer 44 is bonded to the contoured shaped shell 48. The cover layer 44 has an exterior surface 45 which faces the interior of the vehicle. This exterior surface 45 is commonly referred to as a "A surface" in the industry. The A surface should have a pleasing appearance and tactile feel. Although any suitable material may be used, preferably the A surface of the cover layer 44 is made of woven or non-woven cloth. Alternatively, the cover layer 44 could include a layer of vinyl or a felt layer.

Preferably, the cover layer 44 also includes an optional cushion layer 50 for providing loft to the cover layer 44. Suitable materials for the cushion layer 50 include fibrous material, such as PET, and foam materials, such as polyester or polyether foam. The cushion layer 50 provides a relatively pleasant soft elastic tactile "feel" to the cover layer 44. The cushion layer 50 may also help to reduce gaps between the headliner 10 and other trim pieces and components installed on or adjacent the headliner 10 since the cushion layer has an elastic quality. The cover layer 44 and the optional cushion layer 50 may be bonded to the shell 48 by any suitable manner. For example, a spray or sheet adhesive may be used to bond the intermediate fibrous layer 42 to the cushion layer 50. Alternatively, the intermediate layer 42 or the cushion layer 50 could include adhesive additives intermixed therein, such that upon contact with or without heat the intermediate layer 42 bonds to the cushion layer 50.

Figure 3:
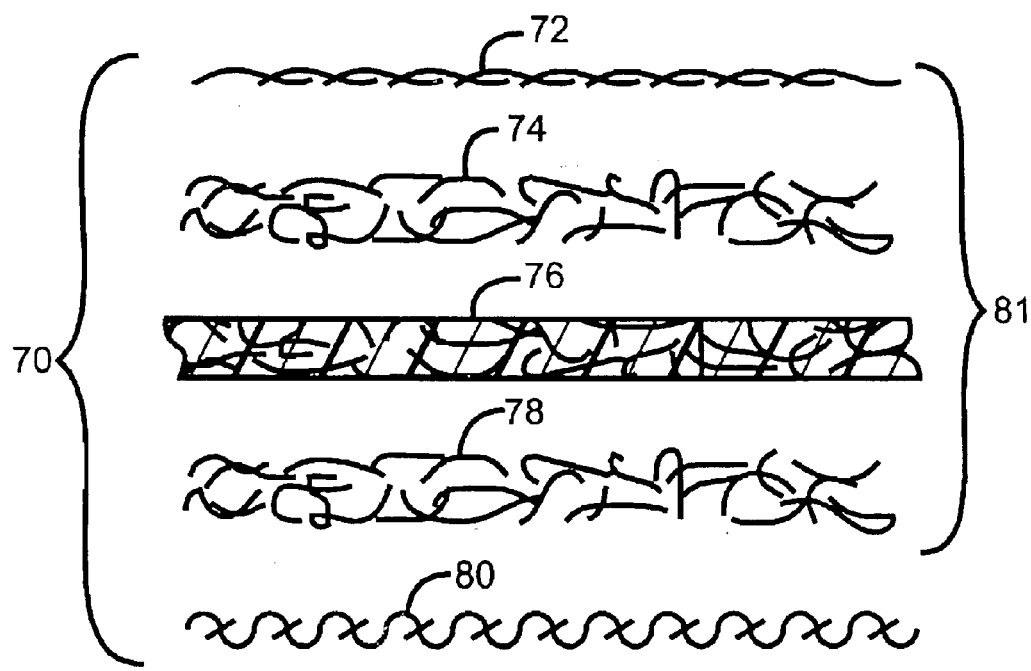
FIG. 3 is a schematic cross-section similar to FIG. 2 illustrating a second embodiment of the invention.

There is illustrated in FIG. 3, another alternate embodiment of the construction of a headliner 70. The headliner generally includes an upper scrim layer 72, a first fibrous layer 74, as structural layer 76, a second fibrous layer 78, and a cover layer 80. The first and second fibrous layers 74 and 78 are similar to the intermediate layer 42 as described above, and are preferably made of polyethylene terephthalate. The first and second fibrous layers 74 and 78 generally provide for acoustic performance in noise attenuation for the headliner 70. The first and second fibrous layers 74 and 78 are bonded on both sides of the structural layer 76. The structural layer 76 is similar to the upper layer 40 as described above, and is preferably made of a thermoplastic resin reinforced with glass fibers interspersed therein. The layers 72, 74, 76, and 78 form a shell 81. The cover layer 80 is similar to the cover layer 44 as described above, and can include a cushion or foam layer, such as the cushion layer 50 described above. The scrim layer 72 is preferably a non-woven synthetic polymeric material, such as a spun-bonded polypropylene commercially available and sold under the trademark "TYPAR" by duPont. The scrim layer 72 provides a generally rigid and acceptable mounting surface for the adhesive attachment of extra components or fastening structures. The scrim layer 72 is optional but is preferred for the headliners of the present invention wherein a fibrous layer, such as the first fibrous layer 74, is the upper surface of the headliner since the adhesive attachment to the upper surface of the fibrous layer may not be sufficient due to its porous and loose nature. The scrim layer 72 also provides an adequate exposed surface for the manual handling of the headliner 70, as compared to an exposed fibrous layer. Generally, the structural layer 76 and 40 have a sufficient upper surface for the adhesive attachment of extra components or fastening structures.

It should be understood that the various layers of the headliner 10 and 70 may be interchanged. For example, the headliner 10 may include a scrim layer 72.

A preferred method of manufacturing the headliner 10 will now be described. It should also be understood that additional steps may be taken to include layers of the headliner 70 as illustrated in FIG. 3, which are not shown in the headliner 10 of FIG. 2.

Figure 4:
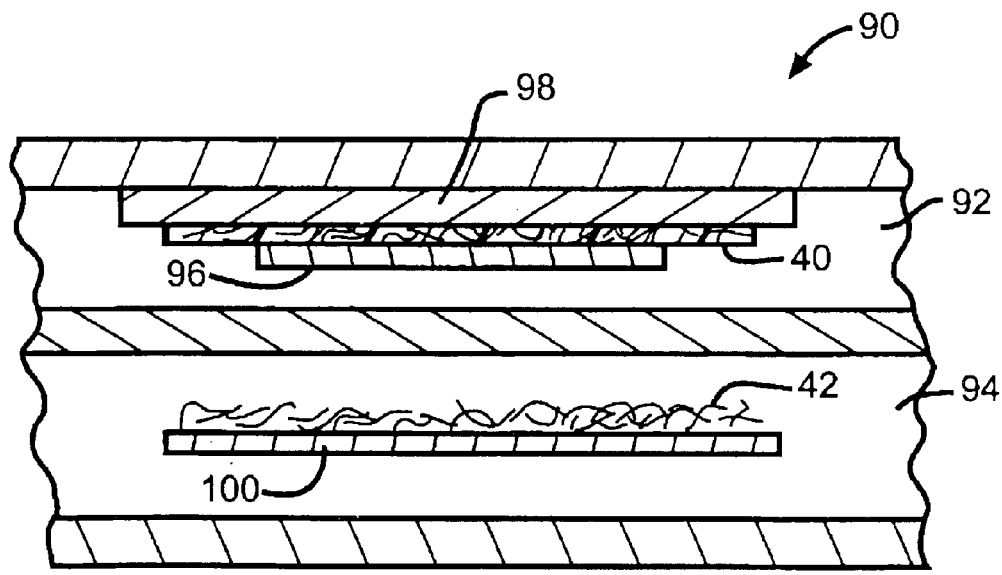
FIGS. 4 though 7 illustrate the steps of a preferred method of manufacturing the headliner of the present invention.

The upper layer 40 and the intermediate layer 42 are provided generally in separate sheet form corresponding to the dimensions of the headliner 10. The intermediate layer 42 could be provided in a generally loose fibrous formation. The upper layer 40 and the intermediate layer 42 are then heated. There is illustrated in FIG. 4 a schematic representation of a chambered oven 90 suitable for heating the upper layer 40 and the intermediate layer 42. The oven 90 includes a first portion 92 and a second portion 94 which are preferably isolated from one another. The upper layer 40 is introduced into the first portion 92 of the oven 90. The upper layer 40 may be supported in and through the oven 90 by a first transport frame member 96. The upper layer 40 is heated to a first temperature. Although the upper layer 40 may be heated by any suitable method, preferably the upper layer 40 is heated mainly by conduction, such as by direct contact with a heating element 98. Of course, the heating element 98 can contact any portion of the upper layer 40, and may contact both sides thereof. Conduction is the preferred method of heating the upper layer 40 due to the generally rigid nature of the material forming the upper layer 40.

Preferably, simultaneously with the upper layer 40, the intermediate layer 42 is introduced into the second portion 94 of the oven 90. The intermediate layer 42 may be supported in and through the oven 90 by a perforated second transport frame member 100. The intermediate layer 42 is heated to a second temperature. Although the upper layer 40 may be heated by any suitable method, preferably the upper layer 40 is heated mainly by convection or by forced air/steam heating. Convection is the preferred method of heating the intermediate layer 42 (and any other fibrous layers of the headliner 10) due to its fibrous or porous condition.

The upper layer 40 is preferably heated to the first temperature, and the intermediate layer 42 is heated to the second temperature such that the first and second temperatures are different. The reason for this difference in temperature heating is that the materials of the upper and intermediate layers 40 and 42 will typically have different rates of thermal conductivity, thermal expansion, and/or heat content. Thus, the optimal temperature for the bonding of the upper layer 40 and the intermediate layer 42 may be different for each layer.

Figure 5:
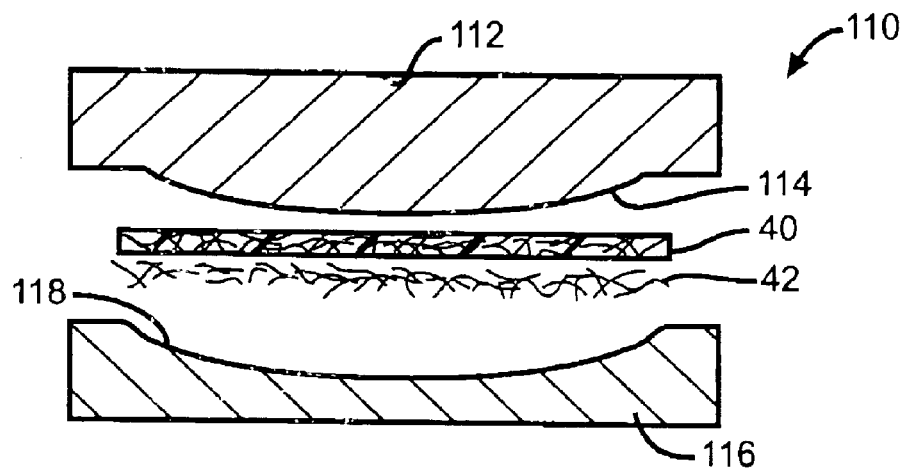
Figure 6:
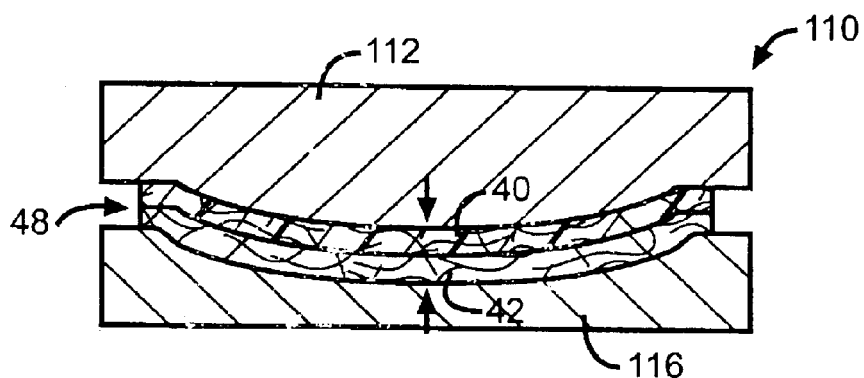

After the upper layer 40 and the intermediate layer 42 have been properly heated at their optimal temperature, the upper layer 40 and the intermediate layer 42 are inserted into a mold, indicated generally at 110 in FIG. 5. The mold includes an upper half 112 having a contoured surface 114, and a lower half 116 having a contoured surface 118. The upper layer 40 and the intermediate layer 42 are then compressed together to bond the upper layer 40 to the intermediate layer 42 to form the shell 48, as shown in FIG. 6. The upper surface of the upper layer 40 will generally conform to the contoured surface 114 of the upper half 112 of the mold 110. The lower surface of the intermediate layer 42 will generally conform to the contoured surface 118 of the lower half 116 of the mold 110. The upper layer 40 and the intermediate layer 42 can be compressed within the mold 110 at any pressure. The upper layer 40 will generally be bonded to the intermediate layer 42 due to the tackiness of the thermoplastic resin layer of the upper layer 40 when heated. Of course, adhesives may also be applied to one or both of the upper layer 40 and intermediate layer 42 to assist in the bonding. The shell 48 is then removed from the mold 110.

Figure 7:
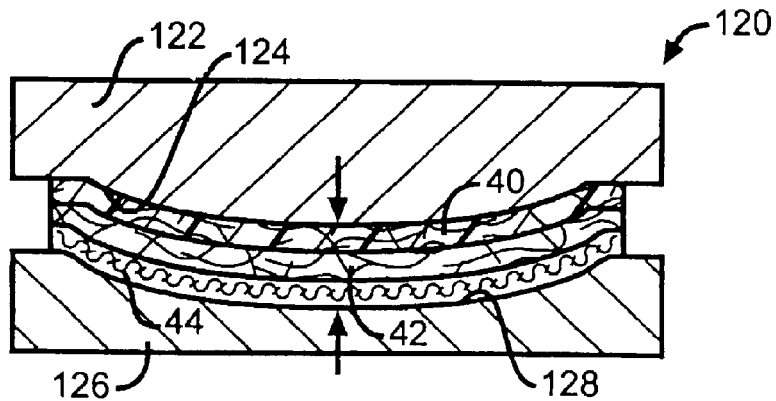

The cover layer 44 is preferably placed into another mold 120, as shown in FIG. 7. The mold 120 includes an upper half 122 having a contoured surface 124, and a lower half 126 having a contoured surface 128. The cover layer 44 is placed on top of the contoured surface 128 of the lower half 126. An adhesive is then preferably sprayed onto the upper surface of the cover layer 44 and/or the lower surface of the shell 48. The shell is then placed on top of the cover layer 44, and then the shell 48 and the cover layer 44 are compressed together to form the headliner 10. The shell 48 and the cover layer 46 can be compressed within the mold 120 at any pressure or at essentially no pressure. This compression process may be performed with or without adding or removing heat. The upper surface of the shell 48 will generally conform to the contoured surface 124 of the upper half 122 of the mold 120 which preferably has the same contour as the surface 114 of the mold 110. The lower surface of the cover layer 40 will generally conform to the contoured surface 128 of the lower half 116 of the mold 110. Alternatively, the mold 110 could be used for both operations illustrated in FIGS. 6 and 7.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of forming a shell for a vehicle headliner comprising the steps of:
    a. providing a first layer made of polymeric resin sheet with glass fibers interspersed within said resin sheet;
    b. providing a second layer of fibrous material having sound attenuating properties, wherein said second layer is made of polyethylene terephthalate;
    c. heating the first layer and second layers such that the temperature of the first layer is different than the temperature of the second layer;
    d. inserting the first and second layers into a mold having a desired contoured shape; and
    e. compressing the first and second layers together to bond the layers, thereby forming the shell.

2. The method of claim 1 further including the step of bonding a cover layer to the second layer to form a headliner.

3. The method of claim 2, wherein the cover layer is bonded to the second layer by an adhesive.

4. The method of claim 1, wherein the first layer is heated by a heating conduction process.

5. The method of claim 1, wherein the second layer is heated by a force air heating process.

6. A headliner formed by the method of claim 1.

7. A method of forming a shell for a vehicle headliner comprising the steps of:
    a. providing a first layer made of polymeric resin sheet with glass fibers interspersed within said resin sheet;
    b. providing a second layer of fibrous material having sound attenuating properties;
    c. heating the first layer and second layers such that the temperature of the first layer is different than the temperature of the second layer, wherein the first layer is heated by a heating conduction process;
    d. inserting the first and second layers into a mold having a desired contoured shape; and
    e. compressing the first and second layers together to bond the layers, thereby forming the shell.

8. The method of claim 7 further including the step of bonding a cover layer to the second layer to form a headliner.

9. The method of claim 8, wherein the cover layer is bonded to the second layer by an adhesive.

10. The method of claim 7, wherein said second layer is made of polyethylene terephthalate.

11. The method of claim 7, wherein the second layer is heated by a force air heating process.

12. A headliner formed by the method of claim 7.

13. A method of forming a shell for a vehicle headliner comprising the steps of:
   providing a first layer made of polymeric resin sheet with glass fibers interspersed within said resin sheet;
   b. providing a second layer of fibrous material having sound attenuating properties;
   c. heating the first layer and second layers such that the temperature of the first layer is different than the temperature of the second layer, wherein the second layer is heated by a force air heating process;
   d. inserting the first and second layers into a mold having a desired contoured shape; and
   e. compressing the first and second layers together to bond the layers, thereby forming the shell.

14. The method of claim 13 further including the step of bonding a cover layer to the second layer to form a headliner.

15. The method of claim 14, wherein the cover layer is bonded to the second layer by an adhesive.

16. The method of claim 13, wherein said second layer is made of polyethylene terephthalate.

17. The method of claim 13, wherein the first layer is heated by a heating conduction process.

18. A headliner formed by the method of claim 13.

* * * * *